(12) United States Patent
Izui

(10) Patent No.: US 11,121,804 B2
(45) Date of Patent: Sep. 14, 2021

(54) BASE STATION, RADIO TERMINAL, RADIO COMMUNICATION SYSTEM, RADIO COMMUNICATION CONTROL METHOD, AND PROGRAM

(71) Applicant: NEC CORPORATION, Tokyo (JP)

(72) Inventor: Kohei Izui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 182 days.

(21) Appl. No.: 16/513,892

(22) Filed: Jul. 17, 2019

(65) Prior Publication Data

US 2020/0028612 A1 Jan. 23, 2020

(30) Foreign Application Priority Data

Jul. 18, 2018 (JP) .............................. JP2018-135078

(51) Int. Cl.
| | |
|---|---|
| *H04L 1/00* | (2006.01) |
| *H04W 76/27* | (2018.01) |
| *H04W 72/04* | (2009.01) |
| *H04L 5/00* | (2006.01) |

(52) U.S. Cl.
CPC .......... *H04L 1/0026* (2013.01); *H04L 5/0055* (2013.01); *H04W 72/042* (2013.01); *H04W 76/27* (2018.02)

(58) Field of Classification Search
CPC ... H04L 1/0026; H04L 5/0055; H04L 1/1685; H04L 1/1896; H04L 5/006; H04L 1/1854; H04W 76/27; H04W 72/042; H04W 72/0413

See application file for complete search history.

(56) References Cited

U.S. PATENT DOCUMENTS

| | | | |
|---|---|---|---|
| 2008/0031138 A1* | 2/2008 | Okamasu | H04L 1/1825 370/236 |
| 2008/0159205 A1* | 7/2008 | Sekiya | H04L 1/1867 370/328 |
| 2014/0112186 A1* | 4/2014 | Fan | H04W 24/10 370/252 |
| 2017/0318575 A1* | 11/2017 | Park | H04W 72/0446 |
| 2018/0115433 A1* | 4/2018 | Morioka | H04W 72/04 |

FOREIGN PATENT DOCUMENTS

JP 2009-273094 A 11/2009

* cited by examiner

*Primary Examiner* — Vinncelas Louis
(74) *Attorney, Agent, or Firm* — Sughrue Mion, PLLC

(57) ABSTRACT

A radio communication system (1000) according to the present disclosure includes a base station (100) that transmits transmission data, a radio terminal (200) that receives the transmission data from the base station (100) and transmits an acknowledgement for the transmission data to the base station (100). The radio terminal (200) transmits communication quality information measured for a communication status between the radio terminal (200) and the base station (100) to the base station (100). The base station (100) determines control information for controlling a process of the radio terminal (200) to transmit the acknowledgement based on the communication quality information received from the radio terminal (200), and transmits the control information to the radio terminal (200). The radio terminal (200) receives the control information from the base station (100), and transmits the acknowledgement to the base station (100) based on the control information.

19 Claims, 11 Drawing Sheets

BASE STATION, RADIO TERMINAL, RADIO COMMUNICATION SYSTEM, RADIO COMMUNICATION CONTROL METHOD, AND PROGRAM

INCORPORATION BY REFERENCE

This application is based upon and claims the benefit of priority from Japanese patent application No. 2018-135078, filed on Jul. 18, 2018, the disclosure of which is incorporated herein in its entirety by reference.

TECHNICAL FIELD

The present disclosure relates to a base station, a radio terminal, a radio communication system, a radio communication control method, and a program. In particular, the present disclosure relates to a base station, a radio terminal, a radio communication system, a radio communication control method, and a program for transmitting or receiving an acknowledgment for transmission data.

BACKGROUND ART

Japanese Unexamined Patent Application Publication No. 2009-273094 discloses a technique related to a data communication system in which a reception terminal transmits an acknowledgment packet to a transmission terminal in response to a data packet transmitted by the transmission terminal to the reception terminal. The reception terminal according to Japanese Unexamined Patent Application Publication No. 2009-273094 determines an acknowledgment frequency based on an acknowledgment loss rate, a data packet loss rate, and an amount of generated redundant retransmission data packets, or a target value of a reproduction rate. Then, the reception terminal transmits the acknowledgment packet to the transmission terminal based on the determined acknowledgment frequency.

With the technique according to Japanese Unexamined Patent Application Publication No. 2009-273094, the reception terminal side performs calculation processing of the acknowledgment frequency, and the transmission terminal side cannot sufficiently control transmission processing (transmission frequency, transmission timing, or transmission interval, etc.) of the acknowledgement on the reception terminal side. However, when the transmission side is a base station, it is desirable that the base station be able to subjectively control the transmission processing of the acknowledgement in the radio terminal which is the reception side.

SUMMARY

The present disclosure has been made to solve such a problem. An object of the present disclosure is to provide a base station, a radio terminal, a radio communication system, a radio communication control method, and a program for the base station to appropriately control transmission processing of an acknowledgement in the radio terminal which receives data.

A first example aspect of the present disclosure is a base station including:

a determination unit configured to determine control information for controlling a process of a radio terminal to transmit an acknowledgement for transmission data based on communication quality information measured in the radio terminal for a communication status between the radio terminal which is a transmission destination of the transmission data and the base station; and a transmission unit configured to transmit the control information to the radio terminal.

A second example aspect of the present disclosure is a radio terminal including:

a transmission unit configured to transmit, to a base station, communication quality information measured for a communication status between the base station which is a transmission source of transmission data and the radio terminal; and a reception unit configured to receive, from the base station, control information which is determined by the base station based on the communication quality information and which is for controlling a process of transmitting an acknowledgement for the transmission data, wherein the transmission unit transmits the acknowledgement to the base station based on the control information.

A third example aspect of the present disclosure is a radio communication system including:

a base station configured to transmit transmission data; and a radio terminal configured to receive the transmission data from the base station and transmit an acknowledgement for the transmission data to the base station, wherein the radio terminal transmits, to the base station, communication quality information measured for a communication status between the radio terminal and the base station, the base station determines control information for controlling the radio terminal to transmit the acknowledgement based on the communication quality information received from the radio terminal, the base station transmits the control information to the radio terminal, the radio terminal receives the control information from the base station, and the radio terminal transmits the acknowledgement to the base station based on the control information.

A fourth example aspect of the present disclosure is a radio communication control method including:

determining, by a base station, control information for controlling a process of a radio terminal to transmit an acknowledgement for transmission data based on communication quality information measured in the radio terminal for a communication status between the radio terminal which is a transmission destination of the transmission data and the base station; and transmitting, by the base station, the control information to the radio terminal.

A fifth example aspect of the present disclosure is a radio communication control method including:

transmitting, by a radio terminal to a base station, communication quality information measured for a communication status between the base station which is a transmission source of transmission data and the radio terminal;

receiving, by the radio terminal from the base station, control information which is determined by the base station based on the communication quality information and which is for controlling a process of transmitting an acknowledgement for the transmission data; and transmitting, by the radio terminal to the base station, the acknowledgement based on the control information.

A sixth example aspect of the present disclosure is a radio communication control method including:

transmitting, by a radio terminal configured to transmit an acknowledgement for transmission data received from a base station, communication quality information measured for a communication status between the radio terminal and the base station;

determining, by the base station, control information for controlling the radio terminal to transmit the acknowledgement based on the communication quality information received from the radio terminal;

transmitting, by the base station, the control information to the radio terminal;

receiving, by the radio terminal, the control information from the base station; and transmitting, by the radio terminal, the acknowledgement to the base station based on the control information.

A seventh example aspect of the present disclosure is a radio communication control program that causes a computer to execute:

a process of determining, by a base station, control information for controlling a process of a radio terminal to transmit an acknowledgement for transmission data based on communication quality information measured in the radio terminal for a communication status between the radio terminal which is a transmission destination of the transmission data and the base station; and a process of transmitting, by the base station, the control information to the radio terminal.

An eighth example aspect of the present disclosure is a radio communication control program causing a computer to execute:

a process of transmitting, to a base station, communication quality information measured for a communication status between the base station which is a transmission source of transmission data and the radio terminal; and a process of receiving, from the base station, control information which is determined by the base station based on the communication quality information and which is for controlling a process of transmitting an acknowledgement for the transmission data; and a process of transmitting the acknowledgement to the base station based on the control information.

BRIEF DESCRIPTION OF DRAWINGS

The above and other aspects, features, and advantages of the present disclosure will become more apparent from the following description of certain exemplary embodiments when taken in conjunction with the accompanying drawings, in which.

EMBODIMENTS

Hereinafter, embodiments of the present disclosure will be described in detail with reference to the drawings. The same or corresponding elements are denoted by the same signs throughout the drawings, and repeated descriptions will be omitted as necessary for the sake of clarity.

First Embodiment

Figure 1:
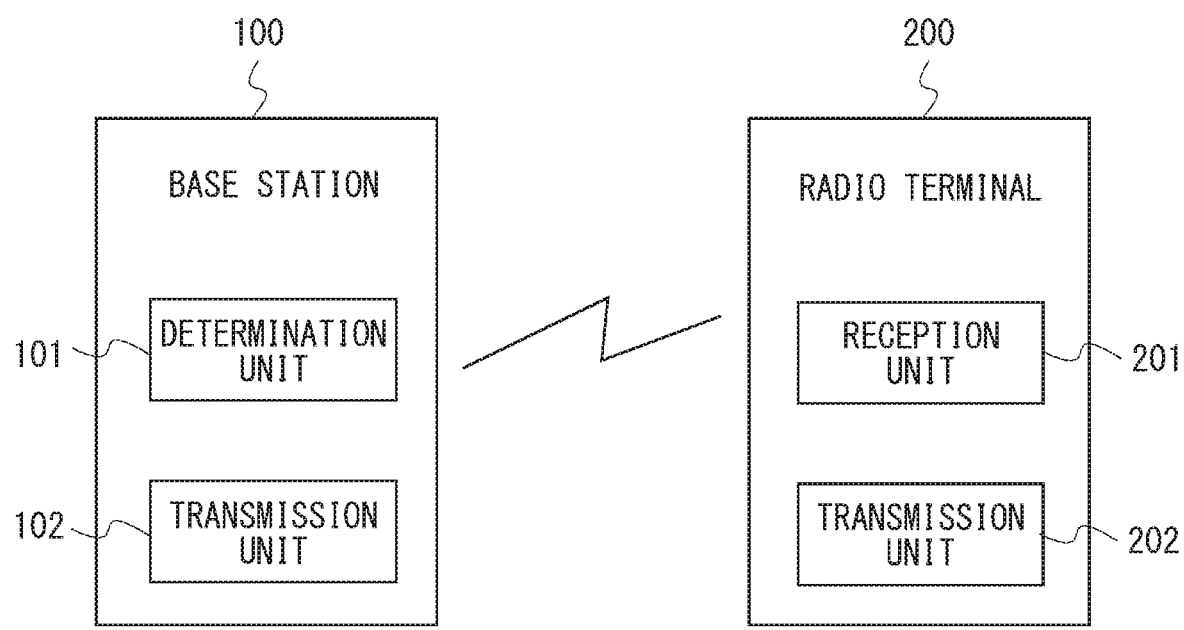
FIG. 1 is a block diagram showing an entire configuration of a radio communication system including a base station and a radio terminal according to a first embodiment of the present disclosure.

FIG. 1 is a block diagram showing an entire configuration of a radio communication system 1000 including a base station 100 and a radio terminal 200 according to a first embodiment. The base station 100 transmits predetermined data to the radio terminal 200. That is, the base station 100 is a transmission source of transmission data, and the radio terminal 200 is a transmission destination of the transmission data from the base station 100. Further, the radio terminal 200 receives the data transmitted from the base station 100 and transmits an acknowledgment for the received data to the base station 100.

The base station 100 includes a determination unit 101 and a transmission unit 102. The determination unit 101 determines control information for controlling transmission processing of the acknowledgement for the transmission data (from the base station 100) in the radio terminal 200 based on communication quality information measured in the radio terminal 200 for a communication status between the radio terminal 200 and the base station 100. The transmission unit 102 transmits the control information to the radio terminal 200.

The radio terminal 200 includes a reception unit 201 and a transmission unit 202. The reception unit 201 receives the transmission data transmitted from the base station 100. Further, the transmission unit 202 transmits, to the base station 100, the communication quality information measured for the communication status between the base station 100 and the radio terminal 200. Then, the reception unit 201 receives the above-mentioned control information from the base station 100. Furthermore, the transmission unit 202 transmits the acknowledgment for the transmission data to the base station 100 based on the control information.

Figure 2:
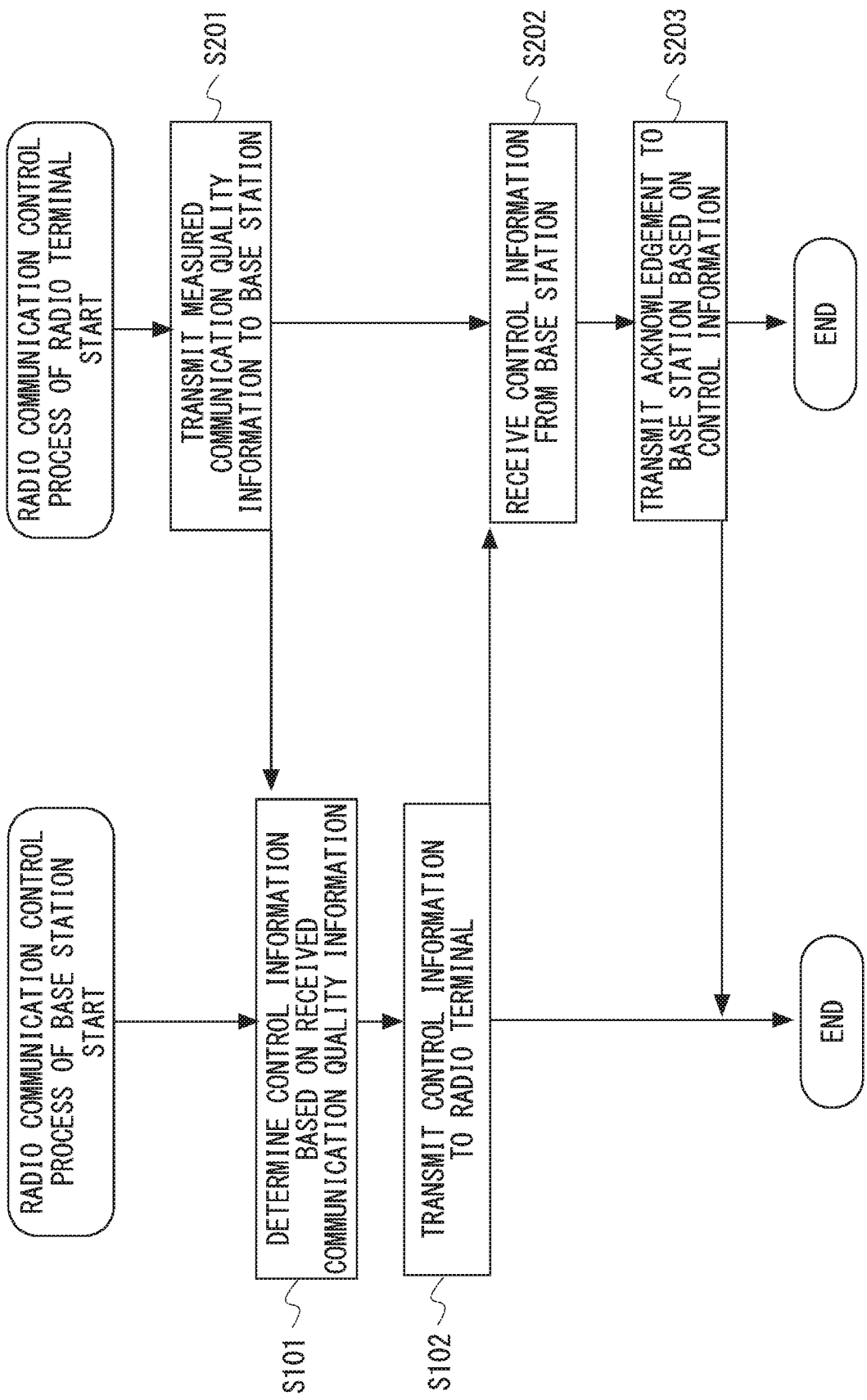
FIG. 2 is a flowchart showing a flow of radio communication control processing of each of the base station and the radio terminal according to the first embodiment.

FIG. 2 is a flowchart showing a flow of radio communication control processing of each of the base station 100 and the radio terminal 200 according to the first embodiment. First, the radio terminal 200 transmits, to the base station 100, the communication quality information measured for the communication status with the base station 100 (S201).

Next, the base station 100 receives the communication quality information from the radio terminal 200, and determines the control information based on the received communication quality information (S101). Then, the base station 100 transmits the control information to the radio terminal 200 (S102).

After that, the radio terminal 200 receives the control information from the base station 100 (S202). It is assumed that, at this time, the radio terminal 200 has received at least the transmission data from the base station 100. Then, the radio terminal 200 transmits the acknowledgement for the received transmission data to the base station 100 based on the received control information (S203).

Each of the base station 100 and the radio terminal 200 includes a radio communication circuit, a processor, a memory, a storage device, and so on as components not shown. Further, the storage device stores a computer program in which the radio communication control processing according to this embodiment is implemented. Then, the processor reads the computer program from the storage device into a memory and executes the computer program. In this way, the processor of the base station 100 implements the above-described functions of the determination unit 101 and the transmission unit 102. Further, the processor of the radio terminal 200 implements the above-described functions of the reception unit 201 and the transmission unit 202.

Thus, in this embodiment, the base station 100 can appropriately control transmission processing of the acknowledgment in the radio terminal 200 which receives the transmission data. For example, when the determination unit 101 determines that the communication quality is satisfactory, it determines the control information so as to reduce the number of transmissions of the acknowledgment in a radio terminal 200a, and transmits the control information determined by the transmission unit 102 to the radio terminal 200. By doing so, the radio terminal 200 reduces the number of transmissions of the acknowledgment according to the control information received from the base station 100. Thus, the base station 100 can control the acknowledgment rate at the radio terminal 200 relatively low. In addition, when the determination unit 101 determines that the communication quality is poor, it determines the control information so as to increase the number of transmissions of the acknowledgment (so as to return to the original number of transmissions) in the radio terminal 200a, and transmits the control information determined by the transmission unit 102 to the radio terminal 200. By doing so, the radio terminal 200 returns the number of transmissions of the acknowledgment to the original number according to the control information received from the base station 100. In this case, the base station 100 can be controlled to maintain the acknowledgment rate at the radio terminal 200. That is, the base station 100 can comprehensively control a transmission frequency, a transmission timing, a transmission interval, and so on in the transmission processing of the acknowledgement in the radio terminal in consideration of the communication quality information measured on the radio terminal 200 side.

Second Embodiment

Figure 3:
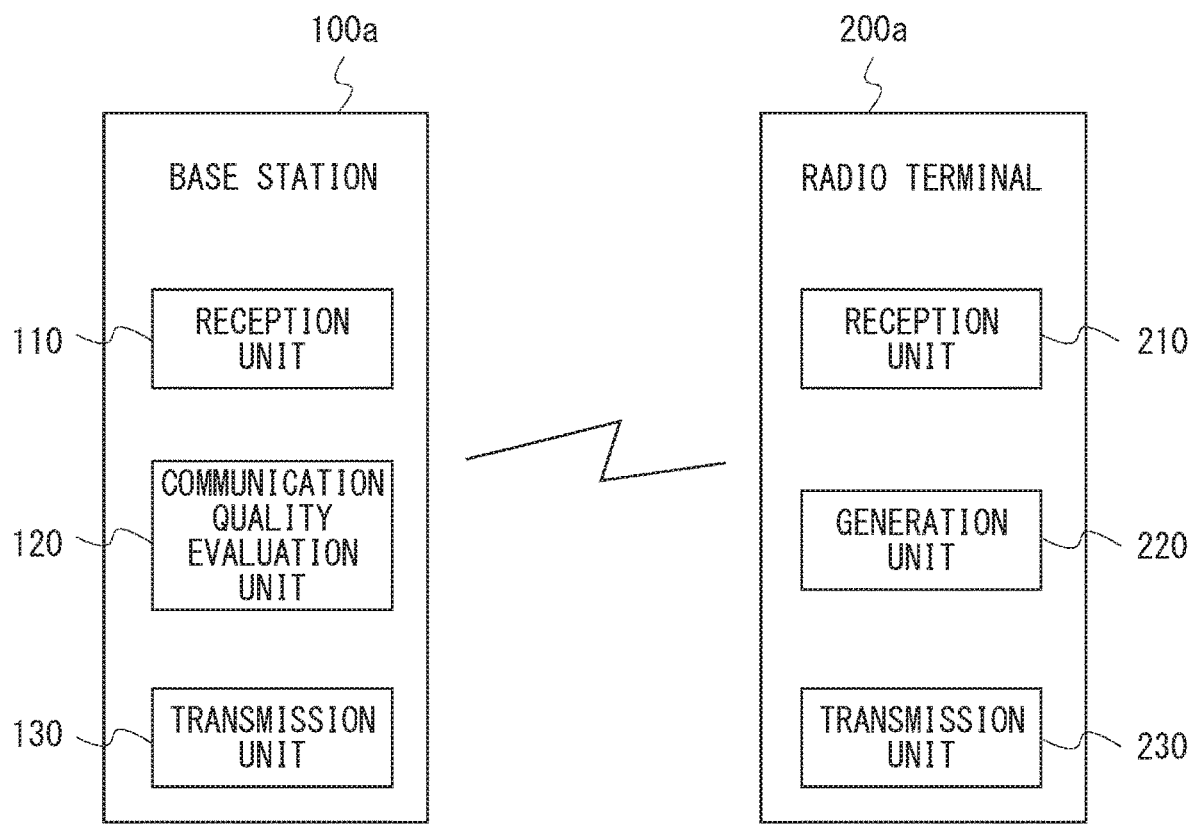
FIG. 3 is a block diagram showing an entire configuration of a radio communication system including a base station and a radio terminal according to a second embodiment.

A second embodiment is a specific example of the above-described first embodiment. FIG. 3 is a block diagram showing an entire configuration of a radio communication system 2000 including a base station 100a and a radio terminal 200a according to the second embodiment. The base station 100a performs radio communication with the radio terminal 200a in accordance with a radio communication standard such as LTE (Long Term Evolution). The base station 100a is also connected to an external network. The base station 100a includes a reception unit 110, a communication quality evaluation unit 120, and a transmission unit 130.

The reception unit 110 receives, from the radio terminal 200a, communication quality information measured in the radio terminal 200a for a communication status between the radio terminal 200a and the base station 100a. Here, the communication quality information is, for example, a transmission rate, a Signal-to-Interference Noise Ratio (SINR), a transmission error, or the like. Alternatively, the communication quality information may be an element (modulation scheme, coding rate, etc.) related to transmission rate control, or an element (signal S, noise N, interference I, etc.) related to SINR. Further, the reception unit 110 receives an acknowledgment (ACK (ACKnowledgement)/NACK (Negative ACKnowledgement)) from the radio terminal 200a in response to the transmission data transmitted by the base station 100a.

The communication quality evaluation unit 120 is an example of the above-described determination unit 101, and determines the above-described control information based on the communication quality information received by the reception unit 110. Here, it can be said that the control information indicates the transmission timing of the acknowledgment in the radio terminal 200a. Examples of the transmission timing include an acknowledgment request, an acknowledgment frequency, and an acknowledgment rate. For example, when the acknowledgement request is used as the control information, the radio terminal 200a transmits the acknowledgement for data already received at that time from the base station 100a in response to the reception of the acknowledgement request from the base station 100a. That is, it can be said that the reception of the acknowledgement request by the radio terminal 200a is the transmission timing of the acknowledgement for the radio terminal 200a.

As described above, the radio terminal 200a may transmit the acknowledgement when receiving the acknowledgement request from the base station 100a, and thus the radio terminal 200a can easily determine whether it is necessary to transmit the acknowledgement. Then, since the base station 100a can control the transmission of the acknowledgment request based on its own judgment, the amount of transmission of the acknowledgment in the radio terminal 200a can be reduced according to the communication quality information.

Further, it can be said that the communication quality evaluation unit 120 generates the acknowledgement request as the control information based on the communication quality information. Then, the communication quality evaluation unit 120 notifies the transmission unit 130 of the determined control information, i.e., the generated acknowledgment request.

Here, when the communication quality information is more satisfactory than a predetermined threshold, the communication quality evaluation unit 120 determines the control information in such a way that a frequency at which the radio terminal 200a is caused to transmit the acknowledgement becomes lower than that when the communication quality information is less satisfactory than the predetermined threshold. Specifically, when the communication quality information is more satisfactory than the predetermined threshold, the communication quality evaluation unit 120 reduces the number of generations of the acknowledgment request.

Moreover, the communication quality evaluation unit 120 can perform preventive control or responsive control in order to control the transmission timing, the transmission frequency, the response rate, the transmission interval, or the like of the acknowledgment in the radio terminal 200*a*.

Here, in the preventive control, an occurrence of the transmission error is predicted from the communication quality information such as the transmission rate and SINR, and control is performed to increase the acknowledgment rate in the radio terminal 200*a* before the transmission error occurs. For example, when the communication quality evaluation unit 120 detects a possibility of an occurrence of the transmission error from the communication quality information, it increases the frequency at which the acknowledgment request is generated. On the other hand, the communication quality evaluation unit 120 reduces the frequency at which the acknowledgment request is generated when the chance of the occurrence of the transmission error becomes low from the communication quality information.

Further, in the responsive control, control is performed to increase the acknowledgment rate in the radio terminal 200*a* when a notification indicating that the transmission error has occurred in the radio terminal 200*a* is received as the communication quality information. For example, when the communication quality information indicates the occurrence of the transmission error in the radio terminal 200*a*, the communication quality evaluation unit 120 increases the frequency at which the acknowledgment request is generated. On the other hand, when the communication quality information does not indicate the occurrence of the transmission error, the communication quality evaluation unit 120 reduces the frequency at which the acknowledgment request is generated. In this manner, the base station 100*a* can control the transmission timing and the acknowledgment rate of the acknowledgment in the radio terminal 200*a*.

When the transmission unit 130 accepts, from the outside, an input of data addressed to the radio terminal 200*a*, it transmits the accepted data to the radio terminal 200*a*. Further, the transmission unit 130 transmits, to the radio terminal 200*a*, the acknowledgement request notified from the communication quality evaluation unit 120.

Note that the communication quality evaluation unit 120 determines the control information for each transmission data. However, the communication quality evaluation unit 120 may determine the control information in such a way that the acknowledgements for a plurality of transmission data pieces are integrated and the integrated acknowledgement is transmitted. Further, the communication quality evaluation unit 120 may further determine resources to be used when the radio terminal 200*a* transmits the acknowledgment. In this case, the transmission unit 130 includes designation of the resources determined by the communication quality evaluation unit 120 in the control information and transmits the control information to the radio terminal 200*a*.

Figure 4:
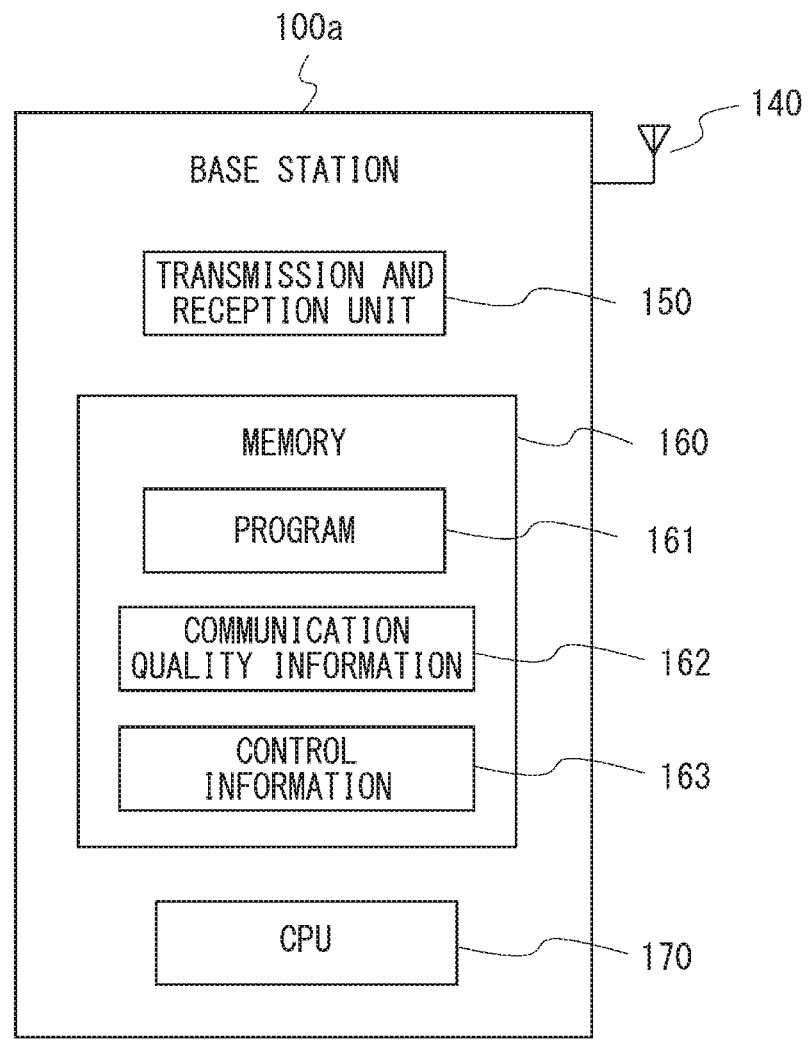
FIG. 4 is a block diagram showing a hardware configuration of the base station according to the second embodiment.

FIG. 4 is a block diagram showing a hardware configuration of the base station 100*a* according to the second embodiment. The base station 100*a* includes an antenna 140, a transmission and reception circuit 150, a memory 160, and a Central Processing Unit (CPU) 170. The antenna 140 is a radio antenna for transmitting and receiving a radio signal at least in radio communication with the radio terminal 200*a*. Note that the antenna 140 may be composed of a plurality of antennas. The transmission and reception circuit 150 converts the transmission data and the acknowledgment request into the radio signal according to an instruction from the CPU 170, and transmits the radio signal to the radio terminal 200*a* using the antenna 140. Further, the transmission and reception circuit 150 converts the radio signal received by the antenna 140 into data (communication quality information, acknowledgement, etc.), and notifies the CPU 170 of the data. Note that the antenna 140 and the transmission and reception circuit 150 may be used for communication with an external network.

The memory 160 is a volatile storage device such as a Random Access Memory (RAM). The memory 160 stores a program 161, communication quality information 162, and control information 163. The program 161 may be stored in a storage device (not shown) and may be loaded into the memory 160 by the CPU 170. Examples of the storage device include a non-volatile storage device such as a hard disk and a flash memory or a ROM (Read Only Memory) but are not limited to them.

The program 161 is an example of a computer program in which radio communication control processing of the base station 100*a* according to the second embodiment is implemented. The communication quality information 162 is information measured in the radio terminal 200*a* for the communication status between the base station 100*a* and the radio terminal 200*a*, which is received by the reception unit 110 from the radio terminal 200*a* and stored in the memory 160. The communication quality information 162 is the above-described transmission rate, the SINR, the transmission error, and the like. Further, the control information 163 is the above-mentioned acknowledgment request, acknowledgment frequency, acknowledgment rate, and the like.

The CPU 170 is an example of a control circuit such as a processor which controls the operation of the base station 100*a*, and may be an MPU (Micro Processor Unit). The CPU 170 loads the program 161 from the above-described storage device into the memory 160 and executes the program. In this manner, the CPU 170 implements the functions of the reception unit 110, the communication quality evaluation unit 120, and the transmission unit 130. It can be also said that the reception unit 110 and the transmission unit 130 are implemented by including the CPU 170, the transmission and reception circuit 150, and the antenna 140.

Returning to FIG. 3, the description is continued. The radio terminal 200*a* is a communication device which performs radio communication with the base station 100*a* in accordance with a radio communication standard at least common to the base station 100*a*. The radio terminal 200*a* includes a reception unit 210, a generation unit 220, and a transmission unit 230.

The reception unit 210 receives data addressed to the radio terminal 200*a* from the base station 100*a*. Further, the reception unit 210 performs correctness determination on the received data. Moreover, the reception unit 210 measures the communication quality in response to the reception of the data. Here, it is assumed that the reception unit 210 measures the above-described transmission rate, SINR, transmission error, or the like as the communication quality. Furthermore, the reception unit 210 receives the control information, for example, the acknowledgement request, transmitted from the base station 100*a* and addressed to the radio terminal 200*a*. The reception unit 210 notifies the generation unit 220 of a result of the correctness determination, the measured communication quality, and the received acknowledgement request. The reception unit 210 may directly notify the transmission unit 230 of the measured communication quality.

The generation unit 220 determines whether the acknowledgment should be generated. Here, when the generation unit 220 is notified of the acknowledgement request from the reception unit 210, it determines that the acknowledgment should be generated. Then, when the generation unit 220 determines that the acknowledgement should be generated, it generates the acknowledgement based on the result of the correctness determination and notifies the transmission unit 230 thereof. The generation unit 220 may notify the transmission unit 230 of the communication quality transmitted from the reception unit 210.

The transmission unit 230 transmits the communication quality notified from the reception unit 210 or the generation unit 220 to the base station 100a. Further, the transmission unit 230 transmits the acknowledgement notified from the generation unit 220 to the base station 100a.

Figure 5:
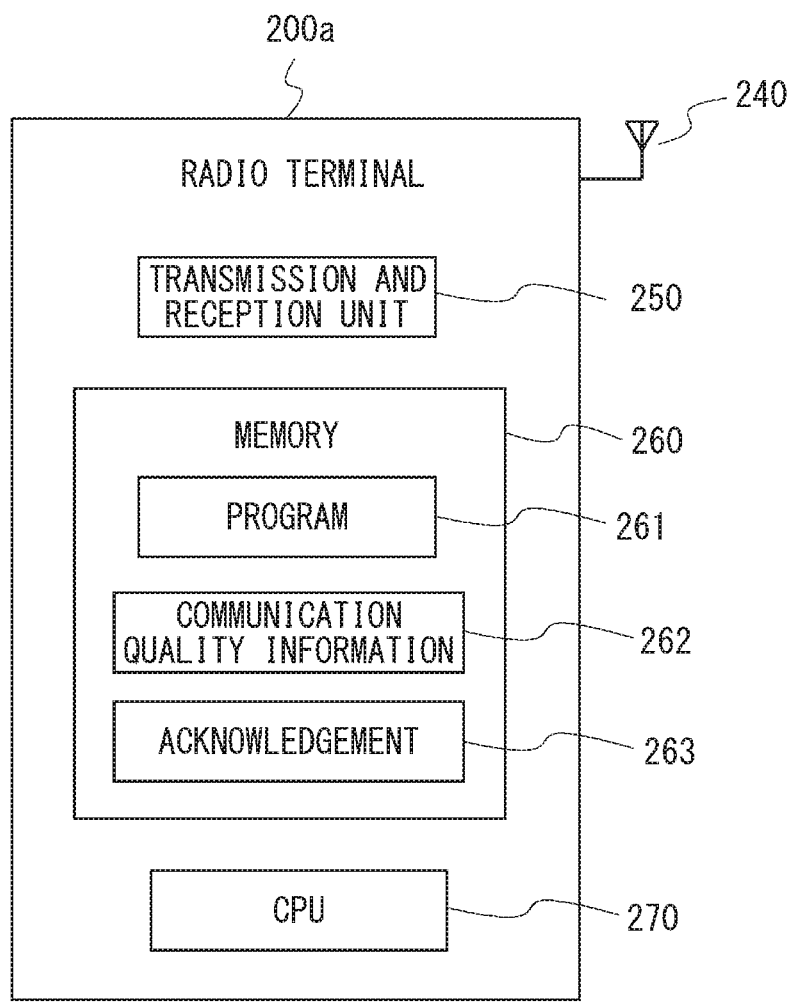
FIG. 5 is a block diagram showing a hardware configuration of the radio terminal according to the second embodiment.

FIG. 5 is a block diagram showing a hardware configuration of the radio terminal 200a according to the second embodiment. The radio terminal 200a includes an antenna 240, a transmission and reception circuit 250, a memory 260, and a CPU 270. The antenna 240 is a radio antenna for transmitting and receiving the radio signal at least in radio communication with the base station 100a. Note that the antenna 240 may be composed of a plurality of antennas. The transmission and reception circuit 250 converts the radio signal received by the antenna 240 into data (received data, acknowledgment request, etc.), and notifies the CPU 270 of the data. Further, the transmission and reception circuit 250 converts the communication quality information and the acknowledgement into a radio signal in accordance with an instruction from the CPU 270, and transmits the radio signal to the base station 100a using the antenna 240.

The memory 260 is a volatile storage device such as a RAM. The memory 260 stores a program 261, communication quality information 262, and an acknowledgment 263. Note that the program 261 may be stored in a storage device (not shown) and may be loaded into the memory 260 by the CPU 270. Examples of the storage device include a non-volatile storage device such as a hard disk and a flash memory or a ROM but are not limited to them.

The program 261 is an example of a computer program in which radio communication control processing of the radio terminal 200a according to the second embodiment is implemented. The communication quality information 262 is the above-described transmission rate, SINR, transmission error, or the like measured by the reception unit 210 for the communication status between the base station 100a and the radio terminal 200a. Further, the acknowledgment 263 is an ACK or NACK packet or the like generated by the generation unit 220.

The CPU 270 is an example of a control circuit such as a processor which controls the operation of the radio terminal 200a, and may be an MPU. The CPU 270 loads the program 261 from the above-described storage device into the memory 260 and executes the program. In this manner, the CPU 270 implements the functions of the reception unit 210, the generation unit 220, and the transmission unit 230. It can be also said that the reception unit 210 and the transmission unit 230 are implemented by including the CPU 270, the transmission and reception circuit 250, and the antenna 240.

Figure 6:
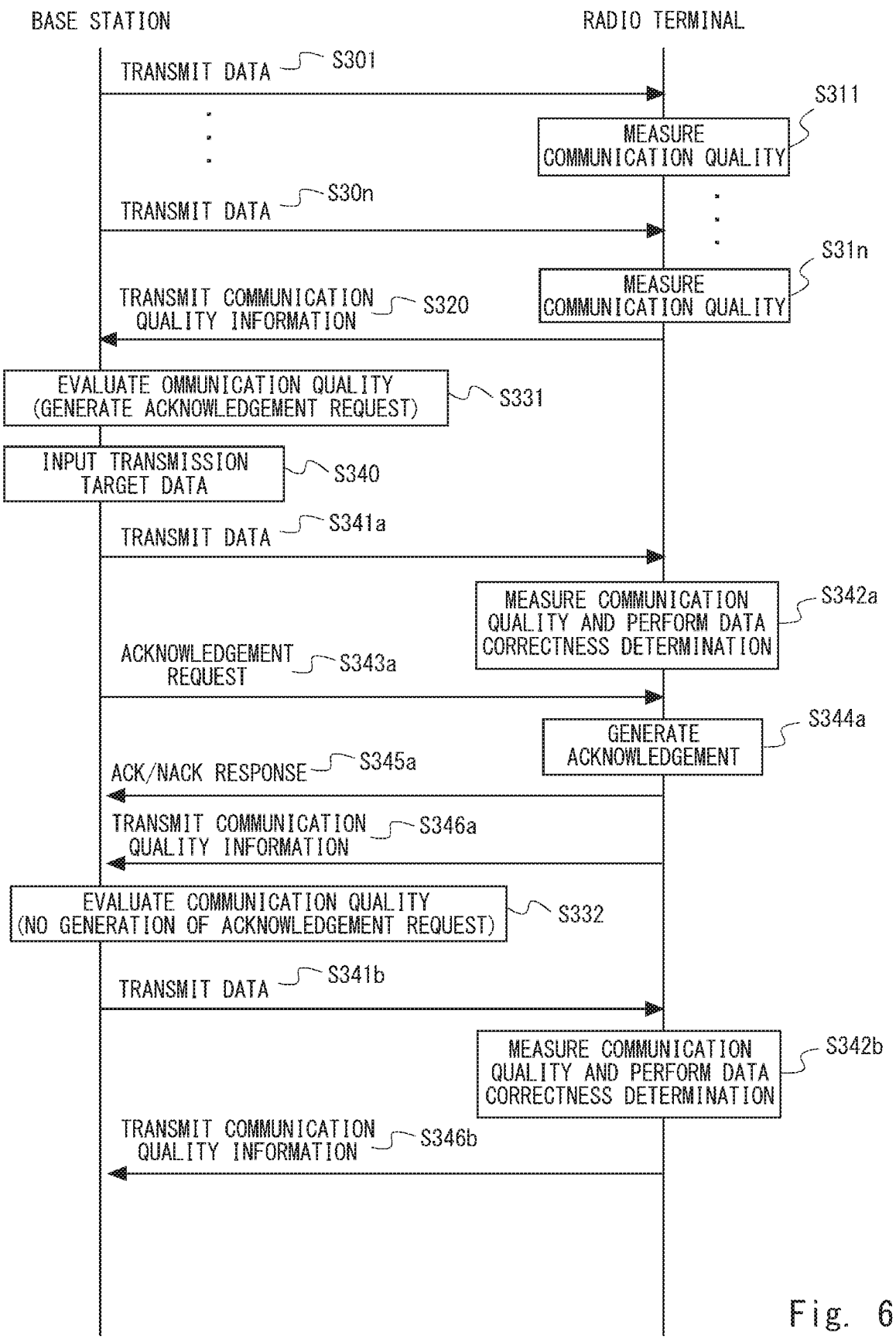
FIG. 6 is a sequence diagram for describing a flow of an ACK/NACK response to an acknowledgment request according to the second embodiment.

FIG. 6 is a sequence diagram for describing a flow of an ACK/NACK response in response to the acknowledgement request according to the second embodiment. First, a case in which the communication quality between the base station 100a and the radio terminal 200a is measured by the radio terminal 200a will be described. The transmission unit 130 of the base station 100a transmits data to the radio terminal 200a (S301). Then, the reception unit 210 of the radio terminal 200a receives the data transmitted from the base station 100a, and measures the communication quality at the time of receiving the data (S311). After that, in a manner similar to the above, the transmission unit 130 continuously transmits a plurality of data pieces to the radio terminal 200a (... S30n), and the reception unit 210 receives the plurality of data pieces from the base station 100a, respectively, and measures the communication quality (... S31n). Then, the transmission unit 230 of the radio terminal 200a integrates the measured communication quality as the communication quality information and transmits it to the base station 100a (S320).

After that, the reception unit 110 of the base station 100a receives the communication quality information from the radio terminal 200a, and the communication quality evaluation unit 120 evaluates the communication quality information (S331), and generates the acknowledgement request as necessary. It is assumed that the acknowledgment request is generated here.

Next, the transmission unit 130 of the base station 100a accepts an input of transmission target data addressed to the radio terminal 200a (S340). Then, the transmission unit 130 transmits the accepted data to the radio terminal 200a (S341a). At this time, it is assumed that the transmission unit 130 transmits a part of the accepted data as a frame. In response to this, the reception unit 210 of the radio terminal 200a receives the data transmitted from the base station 100a, measures the communication quality, and performs the correctness determination on the received data (S342a).

Here, after Step S341a, the transmission unit 130 transmits the acknowledgement request generated by the communication quality evaluation unit 120 to the radio terminal 200a (S343a). In response to this, the reception unit 210 receives the acknowledgement request from the base station 100a. Then, the generation unit 220 determines that the acknowledgement should be generated in response to the reception of the acknowledgement request, and generates the acknowledgement based on a result of the correctness determination on the received data (S344a). After that, the transmission unit 230 transmits the acknowledgment (ACK/NACK response) for the data transmitted in Step S341a to the base station 100a (S345a). Around this time, the transmission unit 230 transmits the communication quality information to the base station 100a (S346a).

After that, the reception unit 110 of the base station 100a receives the communication quality information from the radio terminal 200a, and the communication quality evaluation unit 120 evaluates the communication quality information (S332). Here, it is assumed that the communication quality information is more satisfactory than in that Step S331, and the communication quality evaluation unit 120 does not generate the acknowledgement request.

Next, the transmission unit 130 transmits an unsent part of the accepted data as the frame to the radio terminal 200a (S341b). In response to this, the reception unit 210 of the radio terminal 200a receives the data transmitted from the base station 100a, measures the communication quality, and performs the correctness determination on the received data (S342b). Note that the transmission unit 130 does not transmit the acknowledgement request to the radio terminal 200a after Step S341b. For this reason, the reception unit 210 does not receive the acknowledgement request from the base station 100a, and the generation unit 220 does not generate the acknowledgement. Thus, the transmission unit 230 does not transmit the acknowledgment (ACK/NACK response) for the data transmitted in Step S341b. Note that the transmission unit 230 transmits the communication quality information to the base station 100a (S346b).

Figure 7:
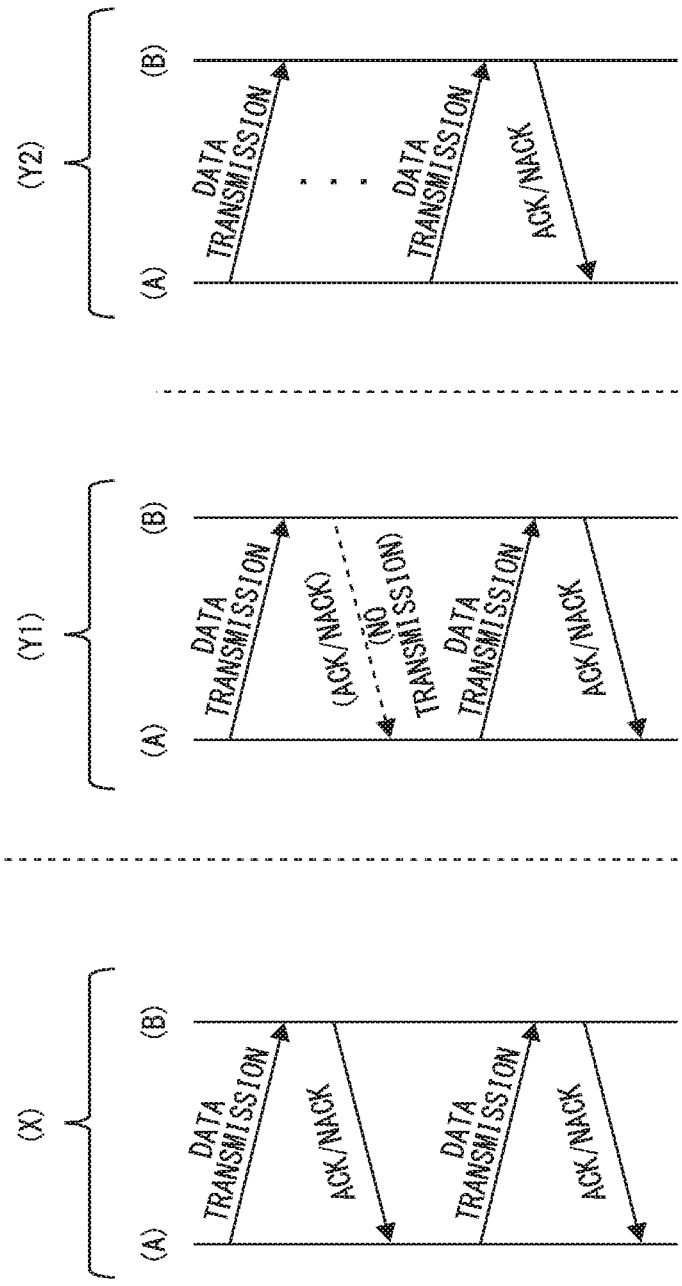
FIG. 7 is a diagram for describing a concept of the number of ACK/NACK responses in accordance with communication quality according to the second embodiment.

FIG. 7 is a diagram for describing a concept of the number of ACK/NACK responses in accordance with the communication quality according to the second embodiment. The case of (X) in FIG. 7 shows a case in which the communication quality is relatively poor. Thus, in this case, the ACK/NACK response is returned for each data transmission unit. That is, it indicates that the ACK/NACK response from the radio terminal B to the base station A is transmitted for each data transmission from the base station A to the radio terminal B. On the other hand, the case of (Y1) in FIG. 7 indicates that the communication quality is relatively moderate, and the case of (Y2) indicates that the communication quality is relatively satisfactory. Thus, in the cases of (Y1) and (Y2), the ACK/NACK response rate is lowered according to the communication quality as compared with (X). That is, in the case of (Y1), no ACK/NACK response is returned for a first data transmission, indicating that the number of ACK/NACK responses can be reduced as compared with (X). Furthermore, the case of (Y2) indicates that the ACK/NACK responses have not been returned for a plurality of data transmissions, and the ACK/NACK response has been returned after the last data transmission. This indicates that the number of ACK/NACK responses can be further reduced as compared with (X). Therefore, the number of transmissions or a transmission capacity of acknowledgments can be reduced by dynamically controlling the acknowledgment (ACK/NACK) response rate according to the radio communication quality (layer 1 communication quality) between devices using radio communication.

Third Embodiment

A third embodiment is an improved example of the above-described second embodiment. In the third embodiment, a unit of the acknowledgement is a plurality of transmission data pieces. That is, the determination unit determines the control information so as to integrate the acknowledgements for the plurality of transmission data pieces and transmit the integrated acknowledgement. This further reduces the number of transmissions of the acknowledgments.

Further, the determination unit may determine the control information in such a way that reception confirmation results for the plurality of transmission data pieces are categorized and included in one acknowledgement packet to respond. By doing so, it is possible to appropriately narrow down the data to be retransmitted when the NACK occurs, thereby effectively preventing excessive data retransmission.

Alternatively, the determination unit may determine the control information in such a way that one reception confirmation result comprehensively determined from the respective reception confirmation results for the plurality of the transmission data pieces is used to respond. In this way, the size of the acknowledgment packet can be reduced, and a transmission delay can be avoided.

The determination unit may designate a plurality of subframes as the plurality of transmission data pieces and determine the control information. Alternatively, the determination unit may designate a plurality of transport blocks including the plurality of subframes as the plurality of transmission data pieces and determine the control information. In this way, the target of the acknowledgment can be correctly known, and the number of transmissions of the acknowledgments can be reduced.

The configurations of a radio communication system, a base station, and a radio terminal according to the third embodiment are the same as those of the above-described second embodiment, and thus the illustration and the detailed description thereof will be omitted.

Figure 8:
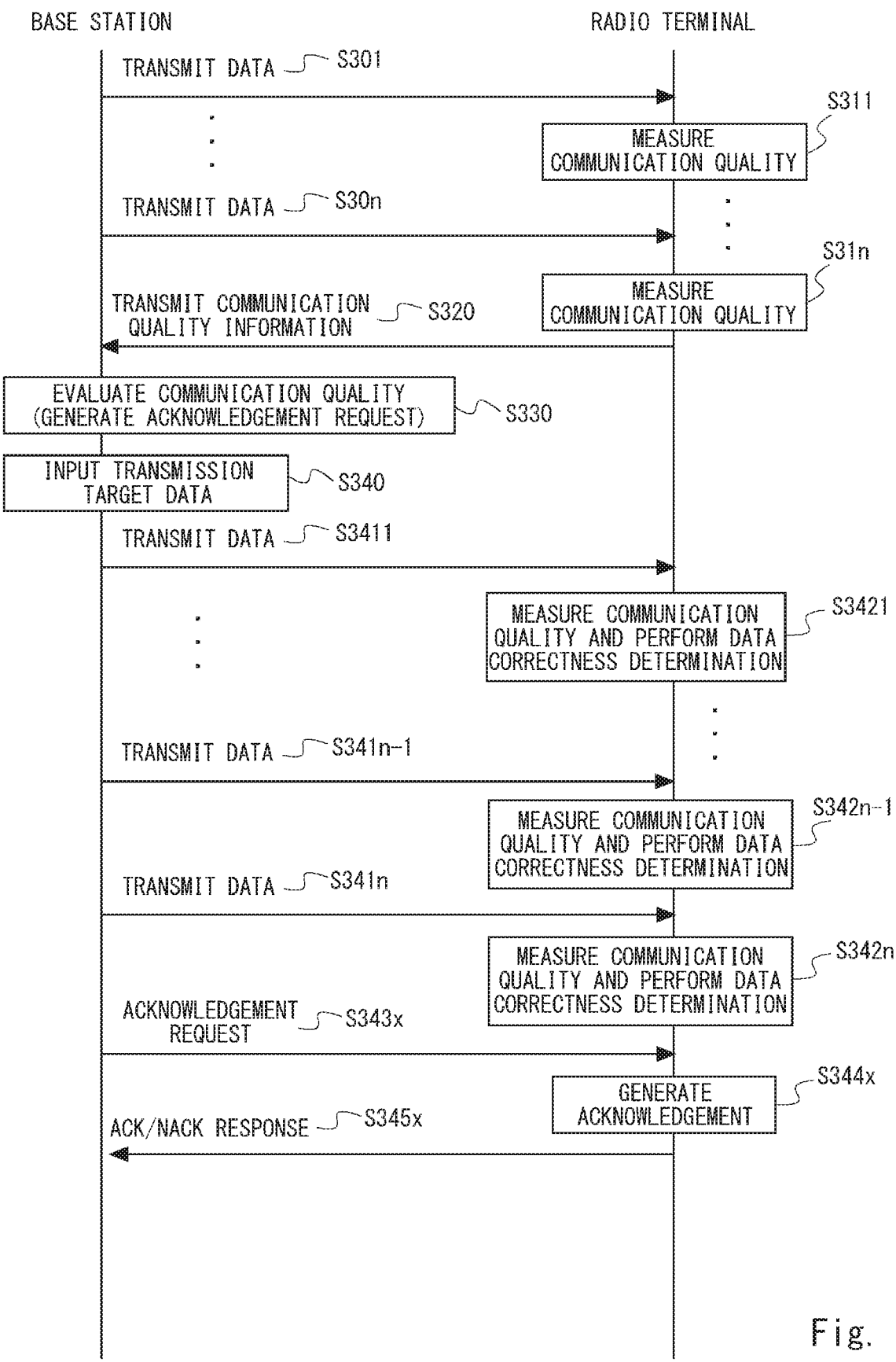
FIG. 8 is a sequence diagram for describing a flow of an integrated ACK/NACK response for a plurality of transmission data pieces according to a third embodiment.

FIG. 8 is a sequence diagram for describing a flow of the integrated ACK/NACK response for a plurality of transmission data pieces according to the third embodiment. Steps S301 to S320 are the same as those in FIG. 6, and thus the descriptions thereof will be omitted.

In Step S330, the reception unit 110 of the base station 100a receives the communication quality information from the radio terminal 200a, and the communication quality evaluation unit 120 evaluates the communication quality information. It is assumed that the acknowledgement request is generated here. It is assumed that, for example, since the communication quality information is satisfactory, the communication quality evaluation unit 120 generates the acknowledgment request so that acknowledgments for transmission data of n times are integrated and the integrated acknowledgement is transmitted.

Then, the transmission unit 130 does not transmit the acknowledgement request immediately after the first to n−1th data transmissions (S3411 to S341n−1). Thus, the reception unit 210 of the radio terminal 200a receives n−1 data pieces, measures the communication quality, and performs the correctness determination on the received data (S3421 to S342n−1). However, the generation unit 220 does not generate the acknowledgment.

Then, immediately after the nth data transmission (S341n), the transmission unit 130 transmits, to the radio terminal 200a, the acknowledgement request for requesting the acknowledgement for the first to nth transmission data pieces (S343x). In response to this, the reception unit 210 of the radio terminal 200a receives the nth data piece transmitted from the base station 100a, measures the communication quality, and performs the correctness determination on the received data (S342n). Further, the reception unit 210 receives the acknowledgement request from the base station 100a. Then, in response to the reception of the acknowledgment request, the generation unit 220 determines that the acknowledgment for the first to nth received data should be generated, and generates one acknowledgment based on the result of the correctness determination on the received n data pieces (S344x). After that, the transmission unit 230 transmits, to the base station 100a, the acknowledgments (ACK/NACK response) for the n data pieces transmitted in Steps S3411 to S341n (S345x). Around this time, the transmission unit 230 may transmit the communication quality information to the base station 100a.

Here, the plurality of transmission data pieces serving as an acknowledgment unit is designated in the acknowledgment request. In this case, examples of the designation methods include the following (1) to (4). Either one of (1) and (2), and either one of (3) and (4) can be combined.

(1) Suspended response: The communication quality evaluation unit 120 can include, in the acknowledgment request, an instruction to categorize each reception confirmation result for each of the plurality of transmission data pieces and include it in one acknowledgment packet. In this case, in Step S344x, the generation unit 220 categorizes each of the data correctness determination results in Steps S3421 to S342n, specifically, includes the results of ACK or NACK corresponding to the n correctness determination results in one acknowledgment packet to generate the acknowledgement packet.

(2) Aggregated response: The communication quality evaluation unit 120 can include, in the acknowledgement request, an instruction to respond with one reception confirmation result comprehensively determined from the respective reception confirmation results for the plurality of transmission data pieces. In this case, in Step S344x, when the number of data errors is a predetermined value or more in the data correctness determination results acquired in Steps S3421 to S342n, the generation unit 220 determines the entire reception confirmation result as an error, and generates the acknowledgment packet indicating NACK.

(3) Designation of the number of subframes: The communication quality evaluation unit 120 can include, in the acknowledgement request, the number of subframes when integrating the acknowledgments. In this case, the transmission unit 130 transmits frame data including the plurality of subframes at one time of a data transmission. Then, in this case, in Step S344x, the generation unit 220 generates the integrated acknowledgement for data having the number of subframes included in the acknowledgment request or less from among data that has already been received and for which no acknowledgment has been transmitted.

(4) Designation of the number of transport blocks: The communication quality evaluation unit 120 can include, in the acknowledgment request, the number of transport blocks when integrating the acknowledgments. Here, it is assumed that one transport block includes a plurality of subframes. In this case, the transmission unit 130 transmits the frame data including one or more transport blocks at one time of a data transmission. Then, in this case, in Step S344x, the generation unit 220 generates the integrated acknowledgement for data having the number of transport blocks included in the acknowledgment request or less from among data that has already been received and for which no acknowledgment has been transmitted.

Fourth Embodiment

A fourth embodiment is a modified example of the above-described second or third embodiments. A determination unit according to the fourth embodiment determines, as the transmission timing, an acknowledgement frequency indicating a frequency at which the radio terminal transmits the acknowledgement. The acknowledgment frequency is, for example, an acknowledgment rate or the like. By doing so, there is no need to transmit the acknowledgement request from the base station 100a to the radio terminal 200a for each transmission data, and thus the amount of data transmission can be further reduced.

Figure 9:
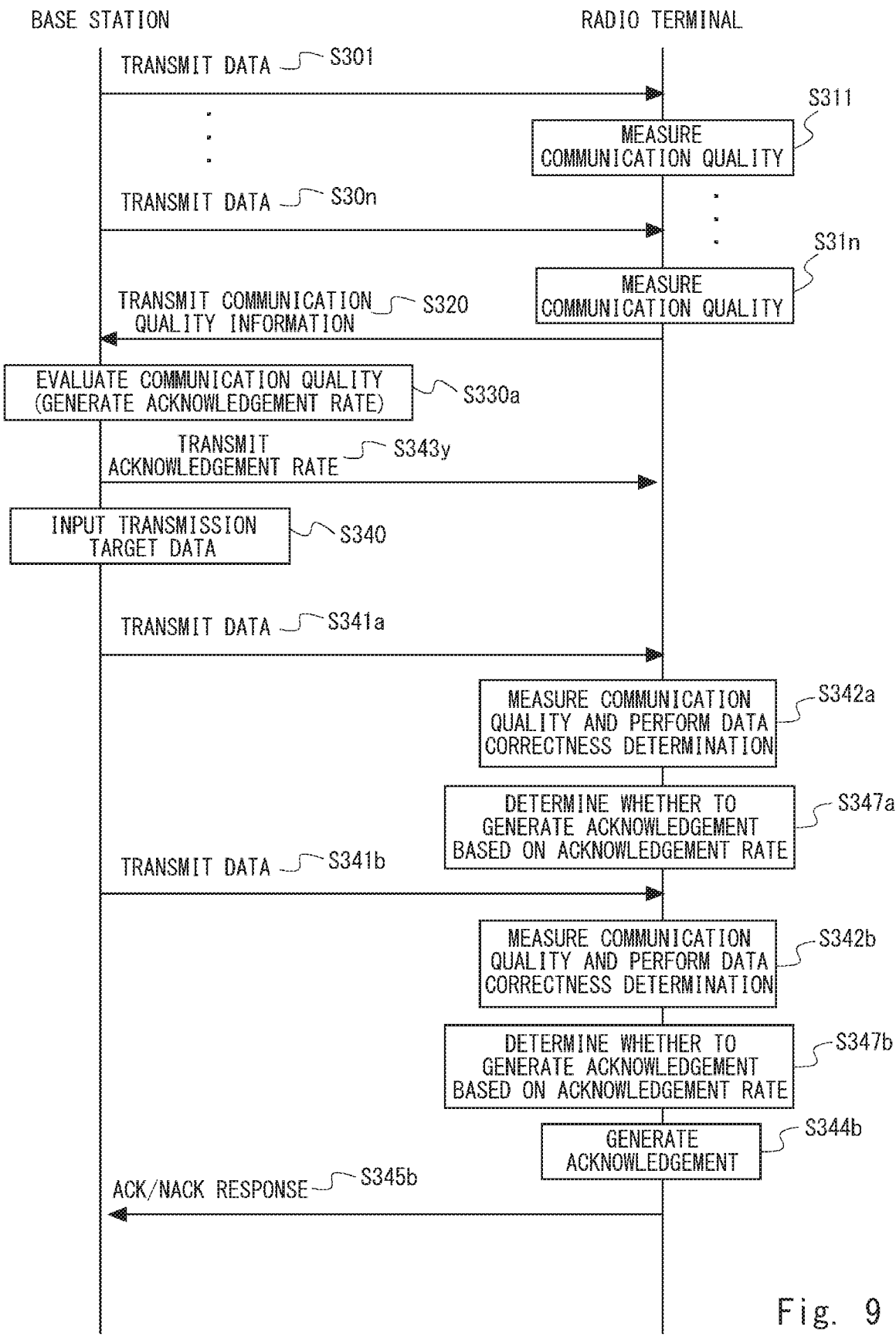
FIG. 9 is a sequence diagram for describing a flow of an ACK/NACK response generation determination in accordance with an acknowledgment rate according to a fourth embodiment.

Configurations of a radio communication system, a base station, and a radio terminal according to the fourth embodiment are the same as those of the above-described second embodiment, and thus the illustration and the detailed description thereof will be omitted. FIG. 9 is a sequence diagram for describing a flow of ACK/NACK response generation determination in accordance with the acknowledgment rate according to the fourth embodiment. Note that Steps S301 to S320 are the same as those in FIG. 6, and thus the descriptions thereof will be omitted.

In Step S330a, the reception unit 110 of the base station 100a receives the communication quality information from the radio terminal 200a, and the communication quality evaluation unit 120 evaluates the communication quality information. It is assumed that the acknowledgement rate is generated here. It is assumed that, for example, since the communication quality information is satisfactory, the communication quality evaluation unit 120 calculates the acknowledgement rate lower than usual.

Then, the transmission unit 130 transmits the acknowledgement rate generated by the communication quality evaluation unit 120 to the radio terminal 200a (S343y). In response to this, the reception unit 210 of the radio terminal 200a receives the acknowledgment rate from the base station 100a. Then, the reception unit 210 stores the received acknowledgment rate in the memory 260.

Next, the transmission unit 130 of the base station 100a accepts an input of transmission target data addressed to the radio terminal 200a (S340). Then, the transmission unit 130 transmits the accepted data to the radio terminal 200a (S341a). At this time, it is assumed that the transmission unit 130 transmits a part of the accepted data as a frame. In response to this, the reception unit 210 of the radio terminal 200a receives the data transmitted from the base station 100a, measures the communication quality, and performs the correctness determination on the received data (S342a).

Next, the generation unit 220 determines whether to generate the acknowledgement based on a probability response rate (S347a). That is, the generation unit 220 determines whether to generate the acknowledgement based on the probability response rate (control information (expected value) from the base station 100a) stored in the memory 260 and an actual transmission record of the acknowledgement (actual value of the probability response rate). For example, when the actual value of the probability response rate exceeds the expected value, the generation unit 220 determines that it is not necessary to generate the acknowledgement. Note that in Step S347a, it is assumed that the generation unit 220 determines that it is not necessary to generate the acknowledgement.

Further, the transmission unit 130 transmits an unsent part of the accepted data as the frame to the radio terminal 200a (S341b). In response to this, the reception unit 210 of the radio terminal 200a receives the data transmitted from the base station 100a, measures the communication quality, and performs the correctness determination on the received data (S342b). Then, the generation unit 220 performs generation determination of the acknowledgement based on the probability response rate (S347b). Here, for example, when the actual value of the probability response rate falls below the expected value, the generation unit 220 determines that the acknowledgment should be generated. Then, in Step S347b, it is assumed that the generation unit 220 determines that the acknowledgement should be generated.

Thus, the generation unit 220 generates the acknowledgement based on a result of the correctness determination in Step S342b (S344b). After that, the transmission unit 230 transmits the acknowledgment (ACK/NACK response) for the data transmitted in Step S341b to the base station 100a (S345b). Note that the transmission unit 230 may transmit the communication quality information to the base station 100a.

As described above, in the fourth embodiment, the base station 100a notifies the radio terminal 200a of the acknowledgment rate in advance. At this time, the acknowledgment rate is calculated on the base station 100a side based on the communication quality information measured on the radio terminal 200a side and is an example of the control information. Then, the radio terminal 200a can easily determine whether the acknowledgment in response to the reception of the data is necessary according to the received acknowledgment rate. Thus, the base station 100a can appropriately control the acknowledgment rate in the radio terminal 200a.

Fifth Embodiment

A fifth embodiment is an improved example of the above-described fourth embodiment. That is, a determination unit according to the fifth embodiment further determines resources to be used by the radio terminal when the acknowledgement is transmitted. Then, the transmission unit further transmits, to the radio terminal, the designation of the determined resources as second control information different from the control information. That is, the resource designation used at the time of the acknowledgment is not included in the control information. This enables flexible resource designation for each individual communication.

Further, the transmission unit includes the control information in a Radio Resource Control (RRC) message and transmits it to the radio terminal. Then, the transmission unit may include the second control information in DCI (Downlink Control Information) and transmits it to the radio terminal. In this manner, this embodiment can be implemented in accordance with a radio communication standard such as LTE.

Figure 10:
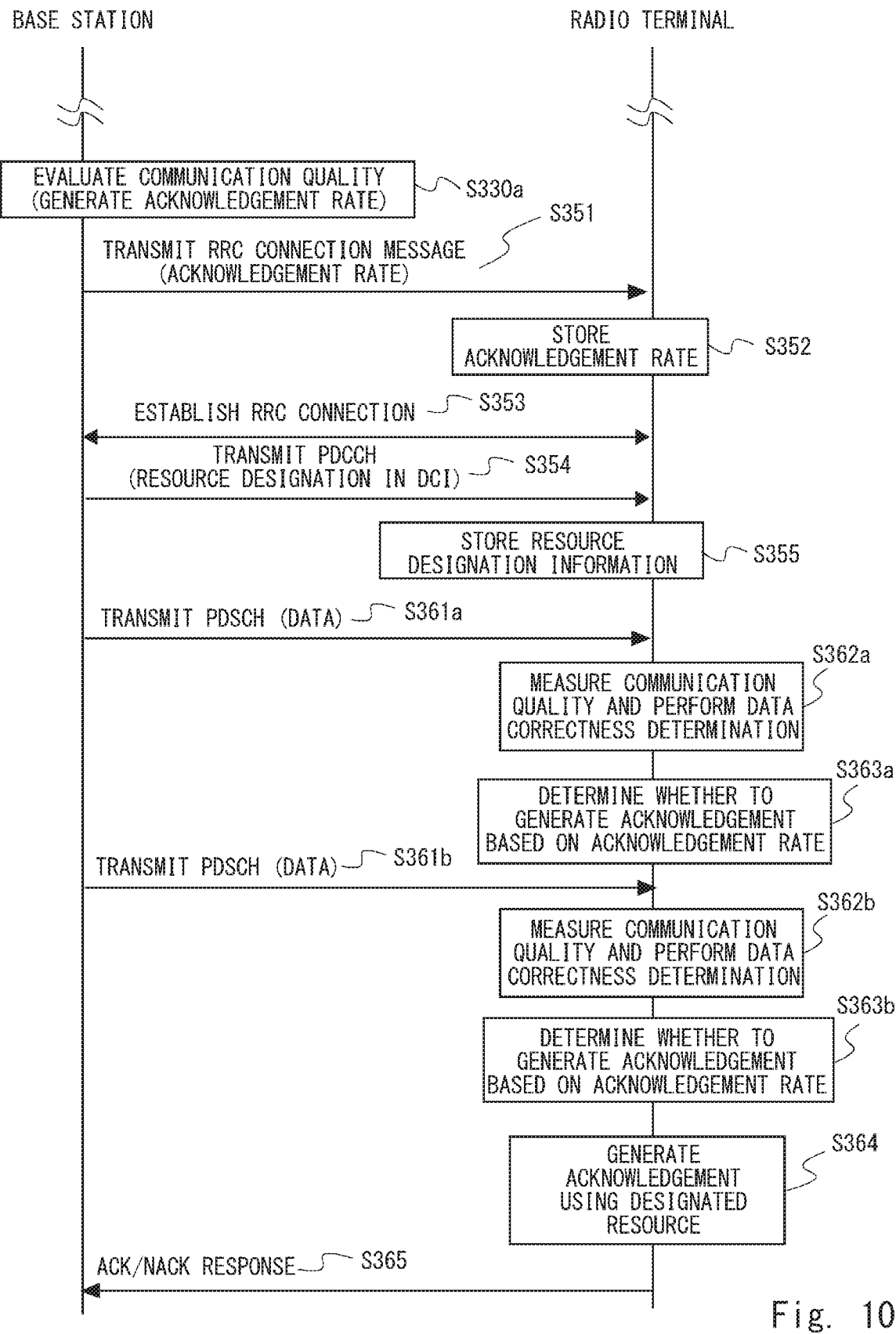
FIG. 10 is a sequence diagram for describing a flow of an ACK/NACK response when an acknowledgment rate and resource designation are separately notified according to a fifth embodiment.

Configurations of a radio communication system, a base station, and a radio terminal according to the fifth embodiment are the same as those of the above-described second embodiment, and thus the illustration and the detailed description thereof will be omitted. FIG. 10 is a sequence diagram for describing a flow of the ACK/NACK response when the acknowledgment rate and the resource designation are separately notified according to the fifth embodiment. The base station 100a determines that the communication quality information measured by the radio terminal 200a has been received in the previous communication with the radio terminal 200a. In this case, the processing may be the same as the processing from Steps S301 to S320 in FIG. 6.

In Step S330a, as in FIG. 9, it is assumed that the communication quality evaluation unit 120 generates the acknowledgment rate. Then, the transmission unit 130 transmits an RRC connection message to the radio terminal 200a in order to establish an RRC connection with the radio terminal 200a (S351). At this time, it is assumed that the transmission unit 130 includes the acknowledgement rate generated in Step S330a in the RRC connection message. In response to this, the reception unit 210 of the radio terminal 200a receives the RRC connection message from the base station 100a. Then, the reception unit 210 extracts the acknowledgement rate from the received RRC connection message, and stores the extracted acknowledgement rate in the memory 260 (S352). Then, it is assumed that an RRC connection is established between the base station 100a and the radio terminal 200a (S353). Note that a well-known technique may be used as the processing for establishing the RRC connection.

Next, the communication quality evaluation unit 120 of the base station 100a determines resources used when the radio terminal 200a transmits the acknowledgement. Then, the transmission unit 130 designates the determined resources in DCI and transmits a PDCCH (Physical Downlink Control Channel) message to the radio terminal 200a (S354). In response to this, the reception unit 210 of the radio terminal 200a receives the PDCCH message from the base station 100a. Then, the reception unit 210 extracts designation information of the resources from the DCI in the received PDCCH message, and stores the extracted designation information of the resources in the memory 260 (S355).

After that, the transmission unit 130 divides data to be transmitted into a predetermined number of frames, includes a first frame in a Physical Downlink Shared Channel (PDSCH) message, and transmits the message to the radio terminal 200a (S361a). In response to this, the reception unit 210 receives the PDSCH message from the base station 100a. Then, the reception unit 210 extracts data from the received PDSCH message, measures the communication quality, and performs the correctness determination on the received data (S362a). Next, as in Step S347a described above, the generation unit 220 performs generation determination on the acknowledgment based on the probability response rate (S363a). Here, assume that it is determined that the generation of the acknowledgement is unnecessary.

Furthermore, the transmission unit 130 includes the unsent frame of the data to be transmitted in the PDSCH message and transmits the PDSCH message to the radio terminal 200a (S361b). In response to this, the reception unit 210 receives the PDSCH message transmitted from the base station 100a, measures the communication quality as in Step S362a, and performs the correctness determination on the received data (S362b). Then, as in Step S363a, the generation unit 220 determines whether to generate the acknowledgement based on the probability response rate (S363b). Here, it is assumed that the generation unit 220 determines that the acknowledgment should be generated.

Thus, the generation unit 220 generates the acknowledgement using the designated resources based on a result of the correctness determination in Step S363b (S364). That is, the generation unit 220 generates the acknowledgement packet using the resources designated in the designation information of the resource stored in the memory 260. After that, the transmission unit 230 transmits the acknowledgment (ACK/NACK response) for the data transmitted in Step S361b to the base station 100a (S365). The transmission unit 230 may transmit the communication quality information to the base station 100a.

Note that the communication quality evaluation unit 120 appropriately redetermines the resources according to data to be transmitted and so on, and transmits the PDCCH messages corresponding to the one in Step S354 each time, thereby enabling flexible resource designation for each individual communication. Moreover, this embodiment can be easily implemented within the range of a radio communication standard such as LTE.

Sixth Embodiment

A sixth embodiment is an applied example of the above-described embodiments. Configurations of a radio communication system, a base station, and a radio terminal according to the sixth embodiment are the same as those of the above-described second embodiment, and thus the illustration and the detailed description thereof will be omitted.

Here, in the sixth embodiment, the following three methods of control are comprehensively considered.
(1) Control method of the ACK/NACK response rate: on what basis the ACK/NACK response rate should be controlled;
(2) Matching method of the ACK/NACK response rate: how to match the ACK/NACK response rate on the data transmission side with that on the data reception side;

(3) Response method of the ACK/NACK: how to make the ACK/NACK response when ACK/NACK response is reduced by the controlled ACK/NACK response rate.

Hereinafter, each of the above (1) to (3) will be described.

(1) Control Method of the ACK/NACK Response Rate

In the sixth embodiment, the ACK/NACK response rate is controlled by switching between preventive control and responsive control.

(1A) Preventive control (transmission rate): The occurrence of the transmission error is predicted from the transmission rate, and control such as increasing the ACK/NACK response rate is performed when the transmission error is predicted to occur.

(1B) Preventive Control (SINR): The occurrence of the transmission error is predicted from SINR, and control such as increasing the ACK/NACK response rate is performed when the transmission error is predicted to occur.

(1C) Responsive control: The control of the ACK/NACK response rate is triggered by the occurrence of the transmission error.

In an environment where it is determined that there are a small number of transmission errors according to any of (1A) to (1C), the ACK/NACK responses for the data transmission unit are reduced, and the ACK/NACK response rate is set low to thereby reduce the ACK/NACK. Further, in an environment where it is determined that there are many transmission errors, the ACK/NACK response for the data transmission unit is increased, and the ACK/NACK response rate is set high. That is, the ACK/NACK is returned for each data transmission unit at the maximum ACK/NACK response rate like in the related art.

(2) Matching Method of the ACK/NACK Response Rate

The method of matching the ACK/NACK response rate on the data transmitting side with that on the data receiving side is switched between conditional matching, interactive matching, and request matching.

(2A) Conditional matching: The ACK/NACK response rate is determined based on the previously-matched communication quality condition.

(2B) Interactive matching: The ACK/NACK response rates are matched as appropriate based on communication quality.

(2C) Request matching: No matching is performed, an ACK/NACK response request is issued, and ACK/NACK is returned only when requested.

(2A) When the conditional matching is used, the ACK/NACK response rate corresponding to the communication quality is set in advance, which eliminates the need for matching the ACK/NACK response rate on the data transmission side with that on the data reception side. (2B) When the interactive matching is used, it is necessary to match the ACK/NACK response rates as appropriate. However, when the communication quality in (1) is applied to a system in which the ACK/NACK response rate on the data transmission side is already matched with that on the data reception side, it is possible to match the ACK/NACK response rates without requiring a new control signal for the interactive control by using the communication quality information. (2C) When the request matching is used, since the ACK/NACK is returned only when requested by the data transmission side, it becomes unnecessary to control the determination of the timing for returning the ACK/NACK in advance, and the data transmission side can control the ACK/NACK response rate. In the request matching, the request frequency is set according to the communication quality to control the ACK/NACK response rate. However, it is not necessary to control the ACK/NACK response rate based on the communication quality.

(3) Response Method of the ACK/NACK

The response method of the ACK/NACK is performed by switching between the following two types: aggregated response and suspended response.

(3A) Aggregated response: The ACK/NACK to be transmitted at the next transmission opportunity is aggregated with all responses in the data transmission unit from the previous transmission opportunity onward into one ACK/NACK, and then the ACK/NACK is transmitted.

(3B) Suspended response: The ACK/NACKs are aggregated and transmitted in an integrated manner at the next transmission opportunity.

(3A) When the aggregated response is used, an error allowance indicating the number of errors which leads to the NACK can be set for each data transmission unit. Moreover, the data transmission unit for aggregating the ACK/NACKs can be set for each implementation. Compared with the (3B) suspended response, (3A) aggregated response achieves a greater effect of reducing the number of ACK/NACK transmissions and the amount of ACK/NACK data. However, when the transmission error (NACK) occurs, the amount of data increases when the transmission side determines that the transmission error has occurred according to the number of aggregated data transmission unit. With regard to the ACK/NACK responses for the aggregated data transmission unit, control may be performed assuming that the ACK response is made by the data transmission side until the corresponding ACK/NACK response is returned.

(3B) When the suspended response is used, the data transmission unit for aggregating the ACK/NACKs can be set for each implementation. (3B) With regard to the suspended response, compared with the (3A) aggregated response, the same level of the effect of reducing the number of ACK/NACK transmissions as that of (3A) aggregated response can be expected, and the amount of data does not increase when the transmission side determines that the transmission error has occurred if the transmission error (NACK) occurs. However, an ACK/NACK transmission delay increases according to the number of suspended data transmission units. With regard to the ACK/NACK response for the suspended data transmission unit, control may be performed on the data transmission side assuming that the ACK response is made by the data transmission side until the corresponding ACK/NACK response is returned.

Figure 11:
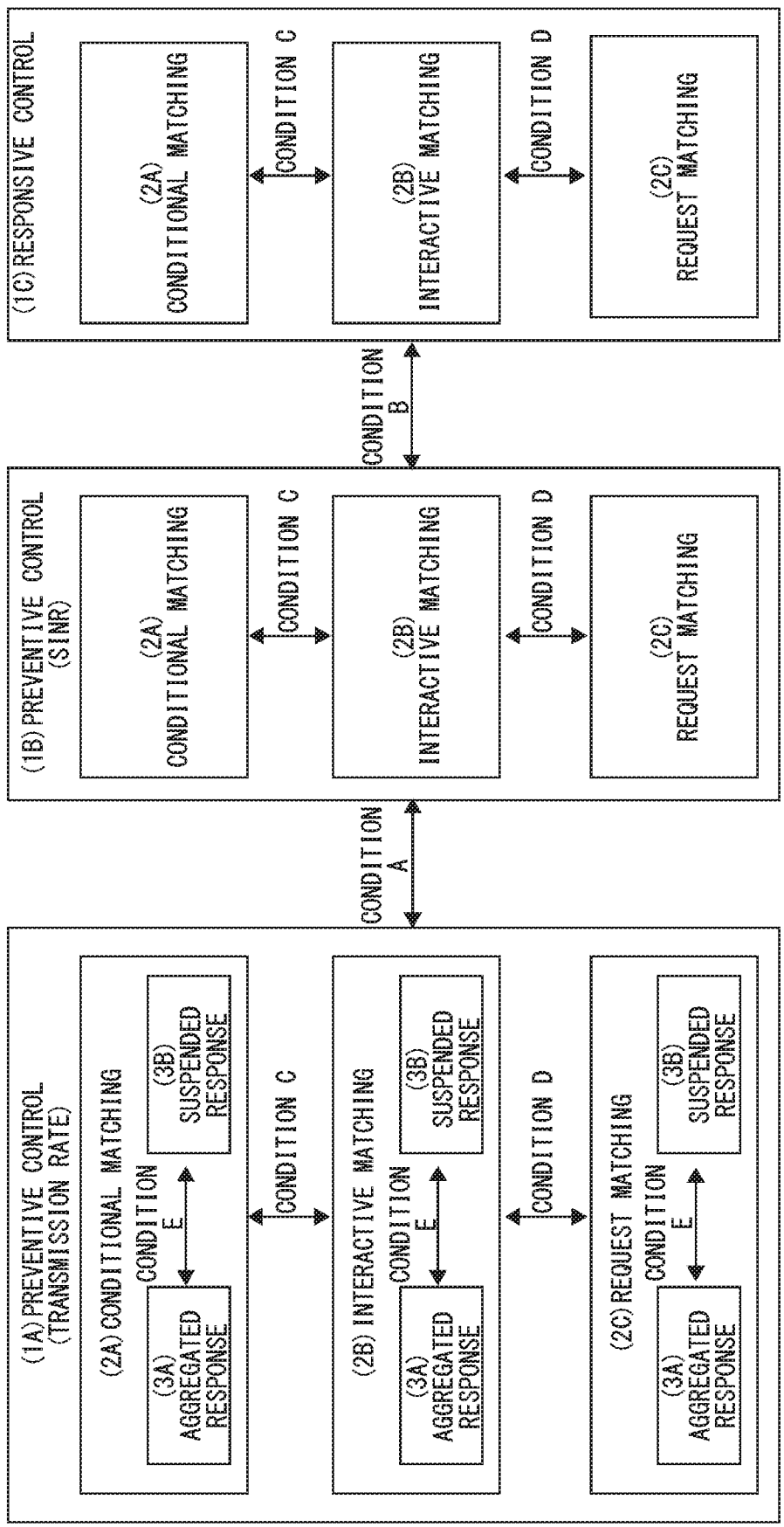
FIG. 11 is a diagram for describing a relationship of radio communication control of a base station according to a sixth embodiment.

FIG. 11 is a diagram for describing the relationship of radio communication control of the base station according to the sixth embodiment. Specifically, FIG. 11 shows that the above-described (1) to (3) can be combined in an integrated manner, and can be switched therebetweeen.

When the control of (1) is used in an integrated manner, the ACK/NACK response rate is controlled using the transmission rate and SINR in the preventive control and the transmission error in the responsive control as the communication quality. For example, a case (1A) in which the transmission rate is used as the communication quality shall be used as a basis of the control. When it is determined that the transmission rate does not function as the communication quality such as when the transmission rate reaches an upper limit value or a lower limit value of the system to be applied (condition A), the (1B) SINR is used as the communication quality. When it is determined that the SINR does not correspond to the transmission error such as when an influence of the transmission rate control or an environmental variation is large (condition B), (1C) the transmission error is used as the communication quality. Note that when the (condition A) or (condition B) is eliminated, the control returns to the previous control.

When the control of (2) is used in an integrated manner, for example, (2A) conditional matching is used as the basis of the control, and the ACK/NACK response rate matching by the conditional matching does not function such as when the communication quality on the data transmission side cannot be matched with that on the data reception side in advance (condition C), (2B) interactive matching is used. When the interactive control does not function (condition D) such as when it is not possible to match the ACK/NACK response rates as appropriate, (2C) request matching is used. When (condition C) or (condition D) is eliminated, the control returns to the previous control.

When the control of (3) is used in an integrated manner, for example, (3A) aggregated response is used as a basis of the control, and in the case of (condition E), (3B) suspended response is used. Here, the (condition E) includes, for example, a case in which the aggregated response does not function due to a constraint etc. on the system to be applied. Alternatively, (condition E) includes a case in which an environment is the one where an effect of improving a communication efficiency by the reduction of ACK/NACK cannot be expected (the amount of data determined that the transmission error has occurred on the transmission side exceeds the amount of data of ACK/NACK which can be reduced). When (condition E) is eliminated, the control returns to the previous control.

Note that each control of (1) to (3) may be partially used according to the system to be applied.

OTHER EMBODIMENTS

The determination unit in each of the above-described embodiments may determine the control information in such a way that the frequency at which the radio terminal $200a$ is caused to transmit the acknowledgement will become greater than a preset lower limit value when the communication quality information is more satisfactory than a predetermined threshold.

Although the above embodiments have been described as a hardware configuration, the present disclosure is not limited to this. The present disclosure can achieve specified processing by causing a CPU to execute a computer program.

In the above-described example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, DVD (Digital Versatile Disc), and semiconductor memories (such as mask ROM, PROM (Programmable ROM), EPROM (erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present disclosure is not limited to the above-described embodiments, and can be changed as appropriate without departing from the spirit of the present disclosure. Further, the present disclosure may be implemented by appropriately combining the respective embodiments.

The whole or part of the exemplary embodiments disclosed above can be described as, but not limited to, the following supplementary notes.

(Supplementary Note A1)

A base station comprising:

a determination unit configured to determine control information for controlling a process of a radio terminal to transmit an acknowledgement for transmission data based on communication quality information measured in the radio terminal for a communication status between the radio terminal which is a transmission destination of the transmission data and the base station; and a transmission unit configured to transmit the control information to the radio terminal.

(Supplementary Note A2)

The base station according to Supplementary note A1, wherein the determination unit determines the control information including a timing for the radio terminal to transmit the acknowledgement.

(Supplementary Note A3)

The base station according to Supplementary note A2, wherein the determination unit determines an acknowledgement request for requesting the radio terminal to transmit the acknowledgement as the transmission timing.

(Supplementary Note A4)

The base station according to Supplementary note A2, wherein the determination unit determines an acknowledgement frequency indicating a frequency at which the radio terminal transmits the acknowledgement as the transmission timing.

(Supplementary Note A5)

The base station according to any one of Supplementary notes A1 to A4, wherein the determination unit determines the control information so as to integrate the acknowledgements for a plurality of pieces of the transmission data and transmit the integrated acknowledgement.

(Supplementary Note A6)

The base station according to Supplementary note A5, wherein the determination unit determines the control information so as to categorize each reception confirmation result for each of the plurality of pieces of the transmission data and include it in one acknowledgment packet to respond.

(Supplementary Note A7)

The base station according to Supplementary note A5, wherein the determination unit determines the control information in such a way that one reception confirmation result comprehensively determined from the respective reception confirmation results for the plurality of pieces of the transmission data is used to respond.

(Supplementary Note A8)

The base station according to Supplementary note A5, wherein the determination unit designates a plurality of subframes as the plurality of pieces of the transmission data and determines the control information.

(Supplementary Note A9)

The base station according to Supplementary note A5, wherein the determination unit designates a plurality of transport blocks including a plurality of subframes as the plurality of pieces of the transmission data and determines the control information.

(Supplementary Note A10)

The base station according to any one of Supplementary notes A1 to A9, wherein the determination unit further determines a resource to be used by the radio terminal when the acknowledgement is transmitted, and the transmission unit includes designation of the determined resource in the control information and transmits the control information to the radio terminal.

(Supplementary Note A11)

The base station according to any one of Supplementary notes A1 to A9, wherein the determination unit further determines a resource to be used by the radio terminal when the acknowledgement is transmitted, and the transmission unit further transmits designation of the determined resource to the radio terminal as second control information different from the control information.

(Supplementary Note A12)

The base station according to Supplementary note A11, wherein the transmission unit includes the control information in an RRC (Radio Resource Control) message and transmits the RRC message to the radio terminal, and the transmission unit includes the second information in DCI (Downlink Control Information) and transmits it to the radio terminal.

(Supplementary Note A13)

The base station according to any one of Supplementary notes A1 to A12, wherein the determination unit determines the control information in such a way that, when the communication quality information is more satisfactory than a predetermined threshold, a frequency at which the radio terminal transmits the acknowledgement becomes greater than a preset lower limit value.

(Supplementary Note A14)

The base station according to any one of Supplementary notes A1 to A13, wherein the determination unit determines the control information for each transmission data.

(Supplementary Note B1)

A radio terminal comprising:

a transmission unit configured to transmit, to a base station, communication quality information measured for a communication status between the base station which is a transmission source of transmission data and the radio terminal; and a reception unit configured to receive, from the base station, control information which is determined by the base station based on the communication quality information and which is for controlling a process of transmitting an acknowledgement for the transmission data, wherein the transmission unit transmits the acknowledgement to the base station based on the control information.

(Supplementary Note B2)

The radio terminal according to Supplementary note B1, wherein the control information includes a transmission timing of the acknowledgement.

(Supplementary Note B3)

The radio terminal according to Supplementary note B2, wherein the transmission timing is an acknowledgement request for requesting the radio terminal to transmit the acknowledgement.

(Supplementary Note B4)

The radio terminal according to Supplementary note B2, wherein the transmission timing is an acknowledgement frequency indicating a frequency at which the radio terminal transmits the acknowledgement.

(Supplementary Note B5)

The radio terminal according to any one of Supplementary notes B1 to B4, wherein the control information includes an instruction for integrating the acknowledgements for a plurality of pieces of the transmission data and transmits the integrated acknowledgement, and the transmission unit integrates the acknowledgements for the plurality of pieces of the transmission data and transmits the integrated acknowledgement to the base station when the reception unit receives the plurality of pieces of the transmission data corresponding to the instruction included in the control information.

(Supplementary Note B6)

The radio terminal according to Supplementary note B5, wherein the control information includes an instruction for categorizing each reception confirmation result for each of the plurality of pieces of the transmission data and include it in one acknowledgement packet, and the transmission unit distinguishes each reception confirmation result for the plurality of pieces of the transmission data received by the reception unit, includes it in one acknowledgement packet, and transmits it as the acknowledgement to the base station.

(Supplementary Note B7)

The radio terminal according to Supplementary note B5, wherein the control information includes an instruction for responding with one reception confirmation result comprehensively determined from respective reception confirmation results for the plurality of pieces of the transmission data, the transmission unit determines one reception confirmation result comprehensively from the respective reception confirmation results for the plurality of pieces of the transmission data, and the transmission unit transmits the determined one reception confirmation result as the acknowledgement to the base station.

(Supplementary Note B8)

The radio terminal according to Supplementary note B5, wherein the control information includes a plurality of subframes designated as the plurality of pieces of the transmission data, and the transmission unit integrates the acknowledgements for the plurality of subframes received by the reception unit and transmits the integrated acknowledgement to the base station.

(Supplementary Note B9)

The radio terminal according to Supplementary note B5, wherein the control information includes a plurality of transport blocks including a plurality of subframes, the plurality of transport blocks being designated as the plurality of pieces of the transmission data, and the transmission unit integrates the acknowledgements for the plurality of transport blocks received by the reception unit and transmits the integrated acknowledgement to the base station.

(Supplementary Note C1)

A radio communication system comprising:

a base station configured to transmit transmission data; and a radio terminal configured to receive the transmission data from the base station and transmit an acknowledgement for the transmission data to the base station, wherein the radio terminal transmits, to the base station, communication quality information measured for a communication status between the radio terminal and the base station, the base station determines control information for controlling the radio terminal to transmit the acknowledgement based on the communication quality information received from the radio terminal, the base station transmits the control information to the radio terminal, the radio terminal receives the control information from the base station, and the radio terminal transmits the acknowledgement to the base station based on the control information.

(Supplementary Note C2)

The radio communication system according to Supplementary note C1, wherein the base station determines the control information including a timing for the radio terminal to transmit the acknowledgement.

(Supplementary Note C3)

The radio communication system according to Supplementary note C1 or C2, wherein the base station determines the control information so as to integrate the acknowledgements for a plurality of pieces of the transmission data and transmit the integrated acknowledgement, and the radio terminal integrates the acknowledgements for the plurality of pieces of the transmission data in and transmits the integrated acknowledgement to the base station when it receives the plurality of pieces of the transmission data corresponding to the instruction included in the control information.

(Supplementary Note D1)

A radio communication control method comprising:

determining, by a base station, control information for controlling a process of a radio terminal to transmit an acknowledgement for transmission data based on communication quality information measured in the radio terminal for a communication status between the radio terminal which is a transmission destination of the transmission data and the base station; and transmitting, by the base station, the control information to the radio terminal.

(Supplementary Note E1)

A radio communication control method comprising:

transmitting, by a radio terminal to a base station, communication quality information measured for a communication status between the base station which is a transmission source of transmission data and the radio terminal;

receiving, by the radio terminal from the base station, control information which is determined by the base station based on the communication quality information and which is for controlling a process of transmitting an acknowledgement for the transmission data; and transmitting, by the radio terminal to the base station, the acknowledgement based on the control information.

(Supplementary Note F1)

A radio communication control method comprising:

transmitting, by a radio terminal configured to transmit an acknowledgement for transmission data received from a base station, communication quality information measured for a communication status between the radio terminal and the base station, determining, by the base station, control information for controlling the radio terminal to transmit the acknowledgement based on the communication quality information received from the radio terminal, transmitting, by the base station, the control information to the radio terminal, receiving, by the radio terminal, the control information from the base station, and transmitting, by the radio terminal, the acknowledgement to the base station based on the control information.

(Supplementary Note G1)

A radio communication control program causing a computer to execute:

a process of determining, by a base station, control information for controlling a process of a radio terminal to transmit an acknowledgement for transmission data based on communication quality information measured in the radio terminal for a communication status between the radio terminal which is a transmission destination of the transmission data and the base station; and a process of transmitting, by the base station, the control information to the radio terminal.

(Supplementary Note H1)

A radio communication control program causing a computer to execute:

a process of transmitting, to a base station, communication quality information measured for a communication status between the base station which is a transmission source of transmission data and a radio terminal; and a process of receiving, from the base station, control information which is determined by the base station based on the communication quality information and which is for controlling a process of transmitting an acknowledgement for the transmission data; and a process of transmitting the acknowledgement to the base station based on the control information.

According to the present disclosure, it is possible to provide a base station, a radio terminal, a radio communication system, a radio communication control method, and a program for the base station to appropriately control transmission processing of an acknowledgement in the radio terminal which receives data.

The first, second, third, fourth, fifth and sixth embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A base station comprising:

a determination unit configured to determine control information for controlling a process of a radio terminal to transmit an acknowledgement for transmission data based on communication quality information measured in the radio terminal for a communication status between the radio terminal which is a transmission destination of the transmission data and the base station; and a transmission unit configured to transmit the control information to the radio terminal, wherein the determination unit determines the control information in such a way that, when the communication quality information is more satisfactory than a predetermined threshold, a frequency at which the radio terminal transmits the acknowledgement becomes greater than a preset lower limit value.

2. The base station according to claim 1, wherein the determination unit determines the control information including a timing for the radio terminal to transmit the acknowledgement.

3. The base station according to claim 2, wherein
the determination unit determines an acknowledgement request for requesting the radio terminal to transmit the acknowledgement as the transmission timing.

4. The base station according to claim 2, wherein the determination unit determines an acknowledgement frequency indicating the frequency at which the radio terminal transmits the acknowledgement as the transmission timing.

5. The base station according to claim 1, wherein the determination unit determines the control information so as to integrate the acknowledgements for a plurality of pieces of the transmission data and transmit the integrated acknowledgement.

6. The base station according to claim 5, wherein
the determination unit determines the control information so as to categorize each reception confirmation result for each of the plurality of pieces of the transmission data and include it in one acknowledgment packet to respond.

7. The base station according to claim 5, wherein
the determination unit determines the control information in such a way that one reception confirmation result comprehensively determined from the respective reception confirmation results for the plurality of pieces of the transmission data is used to respond.

8. The base station according to claim 5, wherein the determination unit designates a plurality of subframes as the plurality of pieces of the transmission data and determines the control information.

9. The base station according to claim 5, wherein the determination unit designates a plurality of transport blocks including a plurality of subframes as the plurality of pieces of the transmission data and determines the control information.

10. The base station according to claim 1, wherein
the determination unit further determines a resource to be used by the radio terminal when the acknowledgement is transmitted, and
the transmission unit includes designation of the determined resource in the control information and transmits the control information to the radio terminal.

11. The base station according to claim 1, wherein
the determination unit further determines a resource to be used by the radio terminal when the acknowledgement is transmitted, and
the transmission unit further transmits designation of the determined resource to the radio terminal as second control information different from the control information.

12. The base station according to claim 11, wherein
the transmission unit includes the control information in an RRC (Radio Resource Control) message and transmits the RRC message to the radio terminal, and
the transmission unit includes the second information in DCI (Downlink Control Information) and transmits it to the radio terminal.

13. The base station according to claim 1, wherein
the determination unit determines the control information for each transmission data.

14. A radio terminal comprising:
a transmission unit configured to transmit, to a base station, communication quality information measured for a communication status between the base station which is a transmission source of transmission data and the radio terminal; and
a reception unit configured to receive, from the base station, control information which is determined by the base station based on the communication quality information and which is for controlling a process of transmitting an acknowledgement for the transmission data, wherein
the transmission unit transmits the acknowledgement to the base station based on the control information, and
wherein the control information is determined by the base station in such a way that, when the communication quality information is more satisfactory than a predetermined threshold, a frequency at which the radio terminal transmits the acknowledgement becomes greater than a preset lower limit value.

15. The radio terminal according to claim 14, wherein the control information includes a transmission timing of the acknowledgement.

16. The radio terminal according to claim 15, wherein the transmission timing is an acknowledgement request for requesting the radio terminal to transmit the acknowledgement.

17. The radio terminal according to claim 15, wherein the transmission timing is an acknowledgement frequency indicating the frequency at which the radio terminal transmits the acknowledgement.

18. The radio terminal according to claim 14, wherein
the control information includes an instruction for integrating the acknowledgements for a plurality of pieces of the transmission data and transmits the integrated acknowledgement, and
the transmission unit integrates the acknowledgements for the plurality of pieces of the transmission data and transmits the integrated acknowledgement to the base station when the reception unit receives the plurality of pieces of the transmission data corresponding to the instruction included in the control information.

19. A radio communication control method comprising:
determining, by a base station, control information for controlling a process of a radio terminal to transmit an acknowledgement for transmission data based on communication quality information measured in the radio terminal for a communication status between the radio terminal which is a transmission destination of the transmission data and the base station; and
transmitting, by the base station, the control information to the radio terminal, and
wherein the control information is determined by the base station in such a way that, when the communication quality information is more satisfactory than a predetermined threshold, a frequency at which the radio terminal transmits the acknowledgement becomes greater than a preset lower limit value.

* * * * *